United States Patent Office 3,272,636
Patented Sept. 13, 1966

3,272,636
METHOD OF CONTROLLING MICROORGANISMS IN FOOD PRODUCTS
Isaac N. Fehr and John Russ, Dallas, Tex., assignors to Campbell Taggart Associated Bakeries, Inc., Dallas, Tex., a corporation of Delaware
No Drawing. Filed Mar. 15, 1965, Ser. No. 440,016
7 Claims. (Cl. 99—214)

This application is a continuation-in-part of our co-pending application for patent, Serial No. 213,907, filed August 1, 1962 entitled, "Method of Controlling Microorganisms in Food Products," now abandoned.

This invention relates to a method of controlling microorganisms in food products and the like that are adversely affected by heat or which may contain types of bacteria that are not killed or rendered incapable of reproduction by reasonable or normal application of heat.

For example, cereal and pastry products, dairy products, beverages and fruit juices, meat products, products marketed under refrigerated conditions, raw products for use as ingredients in foods and other end products, as well as many other foods and food products, have their flavor, quality or usefulness seriously affected by sterilizing temperatures for the time necessary to guarantee safety of such products for consumption by the public or by animals. Also, in many of the products used as food, heat has disadvantages when used for killing certain types of bacteria or even rendering such bacteria incapable of reproduction. One such product, for instance, is bread baked from flour contaminated with *B. subtilis* spores (rope spores). Such spores are not affected by normal baking temperatures, and the bread soon develops a ropy condition, often before leaving the grocer's shelves, and is unsuitable for consumption.

While some food products can be satisfactorily sterilized by heat and/or steam pressure prior to packaging thereof, contamination can occur immediately prior to or during packaging, consequently, further sterilizing is required after packaging to assure complete safety of the product. However, many packages, such as transparent or plastic wrappers, bags, cartons, and the like, are damaged by heat and/or steam pressure, so that such sterilization of the packaged product is impractical and harmful bacteria slip by in the packaged product.

It is also well known that many food products are overcooked by the high heat for the time necessary to assure sterilization, with the result that the taste and quality of the product are seriously altered and the product becomes incompatible for consumption.

The pasteurizing of beverages, such as milk, fruit juices and the like, results in alteration of the flavor.

Customary methods of sterilization by heat also cannot be timed with the processing of the food product, consequently, large storage facilities or long conveying systems are required to retain the heat of sterilization for a sufficient period of time to be effective.

Also, breads are subject to the growth of mold spores and when contaminated become unsalable and must be discarded.

Refrigerated biscuits are particularly subject to deterioration, so that they do not keep well in the store.

It is, therefore, the principal object of this invention to provide a method of sterilizing food products without appreciable heat, by sterilizing the products in a radio frequency field. We have found that immersion in an alternating electric field of radio frequency for a matter of seconds is lethal to disease-bearing microorganisms and/or destructive to the reproductiveness of microorganisms that cause food products to spoil. Therefore, the invention provides a sterilization process that is easily coordinated with output of the product, to eliminate holding time and space usually required for sterilization purposes.

It is also an object of the invention to sterilize foods, food products, beverages, fruit juices, and the like, while packaged in containers of dialectic nature, such as plastics, and which cannot be subjected to high sterilizing temperatures.

The specific products as named above are only a few of the many products that are subject to sterilization by the process of the present invention, consequently, it is to be understood that the invention covers any food product or the like that may be subjected to control, or attenuation, or sterilization of microorganisms by immersion of the product in an alternating electric field of radio frequency.

The invention contemplates the various exposures of the medium to be treated to a radio frequency field such as an alternating electric field the frequency of which is substantially 20 to 40 megacycles per second and with an intensity of 500 to 3,000 volts per centimeter R.M.S.

In carrying out and proving the invention, experiments were performed on pure cultures of lactobacilli and *B. subtilis* (rope) to show the lethal or attenuating effects on such bacteria.

PURE CULTURES OF BACTERIA

Broth cultures of lactobacilli and *B. subtilis* (rope spores) were diluted 1:100 with distilled water, and exposed for 3 minutes, 15 seconds to produce a final temperature of 180° F. One undiluted broth culture of lactobacilli was also exposed to a final temperature of 180° F. (2 minutes). The electronic equipment was adjusted to produce an alternating electric field whose frequency was 27 megacycles per second and whose intensity was 1,000 volts per centimeter R.M.S. In the experiments, the potential gradient was gradually increased to 1,000 volts per centimeter; the overall effect was considerably below the maximum attainable at a constant potential gradient of 1,000 volts per centimeter.

Serial dilutions of the test cultures were made in order to determine the number of living bacteria more accurately after exposure to the radio frequency field as stated above. The controls were not exposed. The results obtained were as follows:

|  | Control Plate | Test Culture Counts |
|---|---|---|
| Lactobacilli Dilution: |  |  |
| 1:100 | TNC* | 110 |
| 1:1,000 | TNC* | 20 |
| 1:10,000 | 700 | 0 |
| *B. subtilis* (rope spores): |  |  |
| 1:100 |  | 65 |
| 1:1,000 | TNC* | 5 |
| 1:10,000 | 800 | 0 |
| Broth Culture of Lactobacilli: |  |  |
| 1:100 | TNC* | 150 |
| 1:10,000 | TNC* | 10 |

*Too numerous to count—several thousand.

Further tests conclude that:

(1) Radio frequency fields in the range of 20 to 40 megacycles and a potential gradient of 500 to 3,000 volts per centimeter have a very lethal or attenuating effect upon both lactobacilli and B. subtilis (rope) bacteria.

(2) The thermal effect does not appear to be responsible for the bacteriostatic and/or bactericidal effect observed, because a B. subtilis (spor stage) culture had been exposed to sterilization at 228° F. (5 p.s.i. steam pressure) for 10 minutes prior to development in culture media, thus demonstrating that the B. subtilis (spore stage) cultures are not destroyed by temperatures in excess of those reached in the radio frequency field.

(3) The extent of sterilization is clearly indicated by results obtained for the 1:100 test cultures and the broth culture. The plate counts show that the exposed cultures were practically sterile when compared with controls prepared using the same dilutions of unexposed cultures.

FRUIT FLAVORED BEVERAGES

Samples of various flavors of fruit-flavored beverages were exposed to radio frequency fields near a range of 20 to 40 megacycles at 1,000 volts per centimeter for 2½ minutes to a temperature of 180° F.

Significant changes in quality were not observed.

BREAD EXPOSED TO A RADIO ELECTRIC FIELD

The following experiments were conducted at a constant potential gradient of 1,000 volts per centimeter and at a frequency of approximately 23 megacycles per second using bread as the product to be treated.

TEST FOR ROPE

Four one-pound loaves of bread were baked with flour contaminated with B. subtilis (rope spores). The experiments were delayed, and a rebake of four additional loaves was made, using the same flour. Within four days' incubation, the contaminated flour would normally produce a ropy condition in bread. Two samples from each bake were used as controls and two samples were exposed to the electric field having the above described characteristics.

*Results on rope*

| Time Exposed | Final Temperature | Days Incubated | |
|---|---|---|---|
| | | 6 | 7 |
| 1 min., 35 sec | 193° F | (−) | (−) |
| 35 sec | 122° F | (−) | Discarded, too moldy. |
| 1 min., 35 sec | 193° F | (−) | (−) |
| 1 min., 35 sec | 193° F | (−) | (−) |
| Controls | | | Ropy in 4 days. |

TESTS FOR MOLD

Four one-pound loaves were also baked and heavily inoculated with black bread mold spores. Two loaves were exposed to a radio frequency field as described, and two loaves were used as controls.

All samples, after exposure, were incubated in the proof box at 90–100° F. and a relative humidity of 90%.

RESULTS ON MOLD

Both controls were heavily molded in three days. The test samples were not molded after six days. Slightly molding occurred after seven days; the molding was probably due to contamination during examination.

Conclusion: Mold spores are greatly reduced or completely destroyed, and bread exposed in the radio frequency field will not develop rope in the time tested.

FURTHER TESTS ON FRUIT FLAVORED BEVERAGES

A volume of 10.0 ml. orange fruit flavored beverage was placed in each of eight sterile test tubes, and each tube was inoculated with 0.10 ml. of a broth culture of Leuconostoc mesenteroides bacteria. A control tube was not exposed. The other tubes, with the contents therein, were exposed to radio frequency fields near 20 to 40 megacycles at 1,000 volts per centimeter. Following exposure of varying time intervals, 1.0 ml. aliquots of each sample were plated to determine the extent of sterilization. The pH of the fruit flavored beverage was adjusted to 5.8 prior to plating.

| Seconds exposed: | Plate count |
|---|---|
| 3 | 5 |
| 5 | 1 |
| 10 | 0 |
| 15 | 0 |
| 20 | 0 |
| 25 | 0 |
| 35 | 0 |
| Control | 300 |

The results indicate that a 10 second exposure of fruit flavored beverages is adequate to destroy all Leuconostoc mesenteroides bacteria present.

Another series of tests to show the effect of radio frequency fields on acetic acid bacteria in a fruit flavored beverage was carried on. In these tests, fruit flavored beverage samples were inoculated with Acetobacter aceti, and the same radio frequency and voltage was used as previously stated. Individual samples were exposed at different intervals. The results obtained are tabulated below.

| Exposure, seconds | Bacteria count |
|---|---|
| 1 | Same as control. |
| 2 | Same as control. |
| 5 | Same as control. |
| 10 | Same as control. |
| 15 | 5,000. |
| 20 | 90. |
| Control, not exposed | 40,000. |

Conclusion: The general effect on Acetobacter aceti bacteria in fruit flavored beverages begins after 15 seconds exposure.

TESTS ON REFRIGERATED BISCUITS

Six cans of biscuits were inoculated with Leuconostoc mesenteroides bacteria to contain 35,000 bacteria per gram. The biscuits could not be effectively exposed in the containers due to the metal foil lining.

Accordingly, the biscuits from three cans were placed in polyethylene bags and sealed prior to exposure.

Two samples were exposed for 2½ minutes (195° F.); one sample was exposed 2 minutes and 5 seconds (125° F.).

Plate counts indicated a substantial reduction in bacterial count of the exposed samples, but an untreated control sample exploded in approximately 30 hours at 70° F. due to Leuconostoc mesenteroides bacteria added.

It is obvious that B. subtilis spores in bread can be reduced to a safe level by an exposure or immersion of bread in an alternating electric field of radio frequency. The exposure time may be reduced materially by selection of the radio frequency, by pulse modulation of the radio frequency field, and/or variation of the potential gradient. The results do not appear to be due to temperature rise. Consequently, B. subtilis and mold spores can be reduced to a safe level by exposure of the wrapped loaf without affecting the wrapper or producing condensate within the wrapper.

It is further obvious that fruit flavored beverages are thoroughly sterilized for lactic acid bacteria at the 10 second exposure level, and for acetic acid bacteria at an exposure level of substantially 20 seconds. The tests also show that the process of sterilization or bacterial control is readily adaptable to carbonated beverages, fruit juices, dairy products, meat, frozen products, etc.

The observed effect on refrigerated biscuits is conclusive as to the desirability of the invention.

The invention also further contemplates a continuous process of attenuation or sterilization on microorganisms in a product by continuously conveying the product into and from an alternating electric field having a radio frequency of 20 to 40 megacycles per second and an intensity of substantially 500 to 3,000 volts per centimeter. The products may be detained for the brief period of time required to effect the desired sterilization or attenuation. The field might also be of sufficient scope so that the product may be continuously conveyed therethrough at a speed to expose the product for the required time. These features of commercially handling the product are important because the short treatment time of sterilization permits the process to be coordinated with the manufacturing and/or packaging operations of the products.

For example, in the case of bread, the wrapped bread is delivered from the bread wrapper to and through the zone of the radio frequency field, the scope of the radio field being determined by the speed of the wrapping machine, so that the bread will be under treatment for the relatively short time required to kill bacteria that usually cause spoilage of bread, particularly mold and the formation of rope.

Likewise, the time of exposure of any product may be regulated by the speed of the product and the length of travel through the field of exposure.

In the case of the bottling of beverages, the travel through the sterilizing zone may be such that the product is exposed for the required time and will be in coordination with the bottling machines.

It is also apparent that control, or attenuation, or sterilization of microorganisms is dependent exclusively on the radio frequency of the alternating electric field, and not upon any heat that may be generated in the zone of the exposure, so that the product may be sterilized without any adverse effects.

An alernating electromagnetic wave field of 20 to 40 megacycles per second is preferable and satisfactory to kill or deactivate microorganisms which normally cause spoilage of food, because in such range it does not cause internal heating of the food sufficiently to perform additional cooking or change the natural flavor thereof.

However, it will be understood that lower frequencies may be desirable in some instances if the food product is relatively resistant to the penetration of higher frequencies, or the particular microorganism is more susceptible to lower frequencies. Higher frequencies up to the dielectric heating range, and voltages up to the puncture voltages of the particular dielectric wrapping material employed, may be employed if additional heating or cooking of the food product is not a consideration.

Dielectric heating usually occurs at about 1,000 megacycles.

Puncture voltages of some typical dielectric materials used in packaging of food products are indicated as follows.

| Material: | Puncture voltage in volts per mil (0.001 inch) |
|---|---|
| Cellulose acetate | 250–600 |
| Glass | 200–250 |
| Glass, Pyrex | 335 |
| Paper | 200 |
| Polyethylene | 1200 |

Therefore, the maximum voltage employed should not normally be more than 1200 volts per mil.

It is emphasized that the packaging material employed in this process is a dielectric material which is transparent to electromagnetic wave energy up to the dielectric heating range of 1,000 megacycles or above, and therefore is not a shield for such energy, as would be a metal or other container made of conductor material.

By virtue of the use of a container of dielectric non-conductor material, food material, both cooked and uncooked, may be pre-packaged and passed through the high frequency alternating field, either before or after freezing or refrigeration, for the desired time *to sterilize it in the package, without heat,* additional cooking, or damage to the package or the food product.

The need for complete sterilization of food products after packaging has become more important and necessary in recent years due to the vast increase in sale and consumption of raw and partly or wholly cooked foods, which are frozen or refrigerated for shipment and display. Such foods remain in such state for long periods of time before consumption. This process permits such foods to be kept indefinitely without danger of contamination.

If the food is packaged in a metal container the material of the container acts as a shield for the high frequency electromagnetic waves, and in order to apply the electromagnetic energy to the material in the package it would be necessary to employ a wave guide, in conjunction with an antenna in the package, to transfer the energy to the food in the container, as disclosed in U.S. Patent No. 2,576,862, issued to K. A. Smith et al.

Examples of types of food products which can be processed by this method, in addition to bakery products, are: milk and other dairy products, wine, beer, carbonated beverages, frozen eggs, spices, meats, dehyrated soups and all types of raw and pre-cooked foods prior to, or after freezing.

Thus, our process, employing dielectric packaging material permits considerable variation of types of wrapping material, shapes and sizes of packages, condition of the food product, whether liquid, solid, frozen or unfrozen, cooked or raw, permits the simplification and economy of equipment, and considerable flexibility in its operation.

Having described our invention we claim:

1. The method of controlling microorganisms in a food or beverage product comprising the steps of: packaging the product in a dielectric container; and exposing the packaged product to a field of alternating electromagnetic wave energy having a frequency of 20 to 40 megacycles at intensity of 500 to 3000 volts per centimeter for a sufficient length of time to attenuate the microorganisms in the product.

2. The method of controlling microorganisms in a food or beverage product comprising the steps of: packaging the product in a container of dielectric material; producing an alternating electromagnetic wave field having a frequency of 20 to 40 megacycles at an intensity of 500 to 3000 volts per centimeter; placing the packaged product on a conveyor; and conveying the packaged product through the field for a sufficient length of time to attenuate the microorganisms in the product.

3. The method called for in claim 1 wherein the product is conveyed through the field.

4. The method called for in claim 2 wherein the product is bread.

5. The method called for in claim 2 wherein the product is a beverage.

6. The method of controlling bacteria present in biscuits, including packaging the biscuits in dielectric containers, producing a radio frequency field having a frequency of 20 to 40 megacycles at substantially 500 to 3,000 volts per centimeter, and conveying the packaged biscuits through said field at a rate in coordination with the packaging step to expose the biscuits for the time of approximately 2½ minutes with an ultimate temperature no higher than 195° F.

7. The method of controlling *B. subtilis* spores in bread, including wrapping baked bread in dielectric wrappers at a wrapping station, creating an alternating electric field of radio frequency of 20 to 40 megacycles per second at an intensity of substantially 500 to 3,000 volts per centimeter, conveying the wrapped bread from the wrapping station, and passing the wrapped bread through the alternating electric field at a speed comparable with the output from the wrapping station for attenuating *B. subtilis* spores.

References Cited by the Examiner
UNITED STATES PATENTS
1,945,867  2/1934  Rawls.
2,193,622  3/1940  Coulter _____ 99—221 X
2,223,813  12/1940  Brown _____ 21—54
2,485,660  10/1949  Robertson _____ 99—221

A. LOUIS MONACELL, *Primary Examiner.*

L. M. SHAPIRO, *Assistant Examiner.*